(12) United States Patent
Zhang

(10) Patent No.: US 9,399,943 B1
(45) Date of Patent: Jul. 26, 2016

(54) SYSTEM AND METHOD FOR DETECTING PARTICULATE FILTER LEAKAGE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/702,988

(22) Filed: May 4, 2015

(51) Int. Cl.
| | | |
|---|---|---|
| *F01N 3/00* | (2006.01) | |
| *F01N 3/02* | (2006.01) | |
| *F01N 3/10* | (2006.01) | |
| *F01N 3/20* | (2006.01) | |
| *F01N 13/08* | (2010.01) | |
| *F01N 3/027* | (2006.01) | |
| *F01N 9/00* | (2006.01) | |
| *F01N 11/00* | (2006.01) | |
| *F02D 41/02* | (2006.01) | |
| *F01N 3/035* | (2006.01) | |

(52) U.S. Cl.
CPC .............. *F01N 13/08* (2013.01); *F01N 3/0275* (2013.01); *F01N 3/035* (2013.01); *F01N 9/002* (2013.01); *F01N 11/00* (2013.01); *F02D 41/0235* (2013.01); *F01N 2470/30* (2013.01); *F01N 2550/04* (2013.01); *F01N 2900/0422* (2013.01)

(58) Field of Classification Search
CPC ....... F01N 13/08; F01N 3/0275; F01N 3/035; F01N 9/002; F01N 11/00; F01N 2470/30; F01N 2550/04; F01N 2900/0422; F02D 41/0235

USPC ................... 60/287, 288, 297, 311
See application file for complete search history.

(56) References Cited

U.S. PATENT DOCUMENTS

| | | |
|---|---|---|
| 7,735,314 B2 | 6/2010 | Lu et al. |
| 8,151,560 B2 | 4/2012 | Zanini-Fisher et al. |
| 8,209,962 B2 | 7/2012 | Sun et al. |
| 8,310,249 B2 | 11/2012 | Paterson |
| 8,490,383 B2 | 7/2013 | Laermann et al. |
| 8,770,016 B2 | 7/2014 | Uchiyama et al. |
| 2011/0072789 A1* | 3/2011 | Konstandopoulos ... F01N 3/021 60/276 |
| 2011/0072801 A1* | 3/2011 | Lupescu ................ F01N 3/031 60/287 |
| 2011/0232362 A1 | 9/2011 | Thiagarajan et al. |
| 2012/0090304 A1 | 4/2012 | Kotrba et al. |
| 2012/0137659 A1* | 6/2012 | Uhrich .................... F01N 5/02 60/274 |
| 2013/0031967 A1 | 2/2013 | Ichimasa |

OTHER PUBLICATIONS

Zhang, Xiaogang, "Method and System for Particulate Filter Leakage Detection," U.S. Appl. No. 14/882,164, filed Oct. 13, 2015, 48 pages.

* cited by examiner

*Primary Examiner* — Audrey K Bradley
*Assistant Examiner* — Dapinder Singh
(74) *Attorney, Agent, or Firm* — Julia Voutyras; Alleman Hall McCoy Russell & Tuttle LLP

(57) ABSTRACT

Methods and systems are provided for determining degradation of a particulate filter in an exhaust conduit. In one example, a method may include diverting exhaust gas to a secondary flow assembly comprising a filter and determining degradation based on time intervals between subsequent filter regenerations of the filter in the secondary flow assembly.

19 Claims, 4 Drawing Sheets

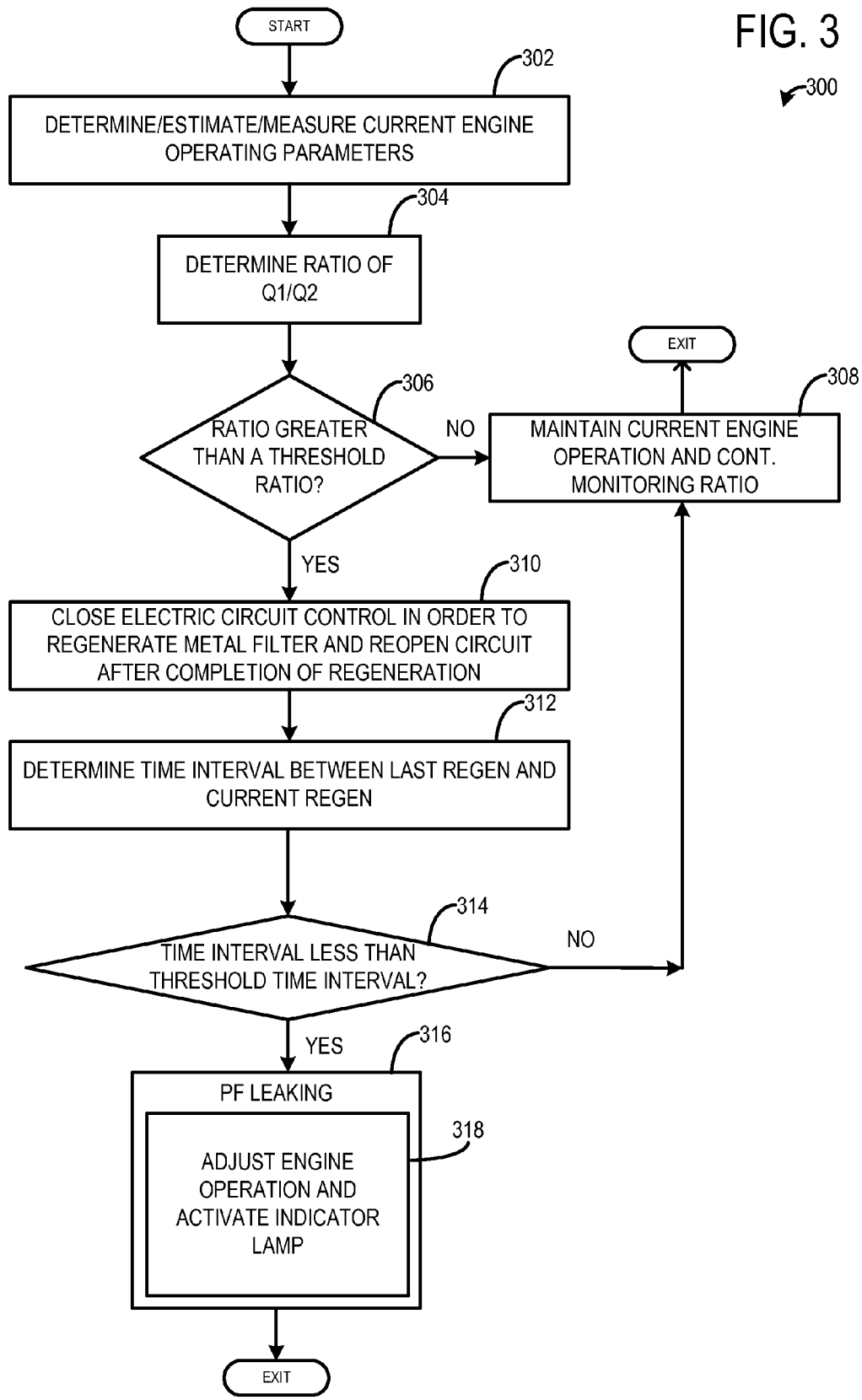

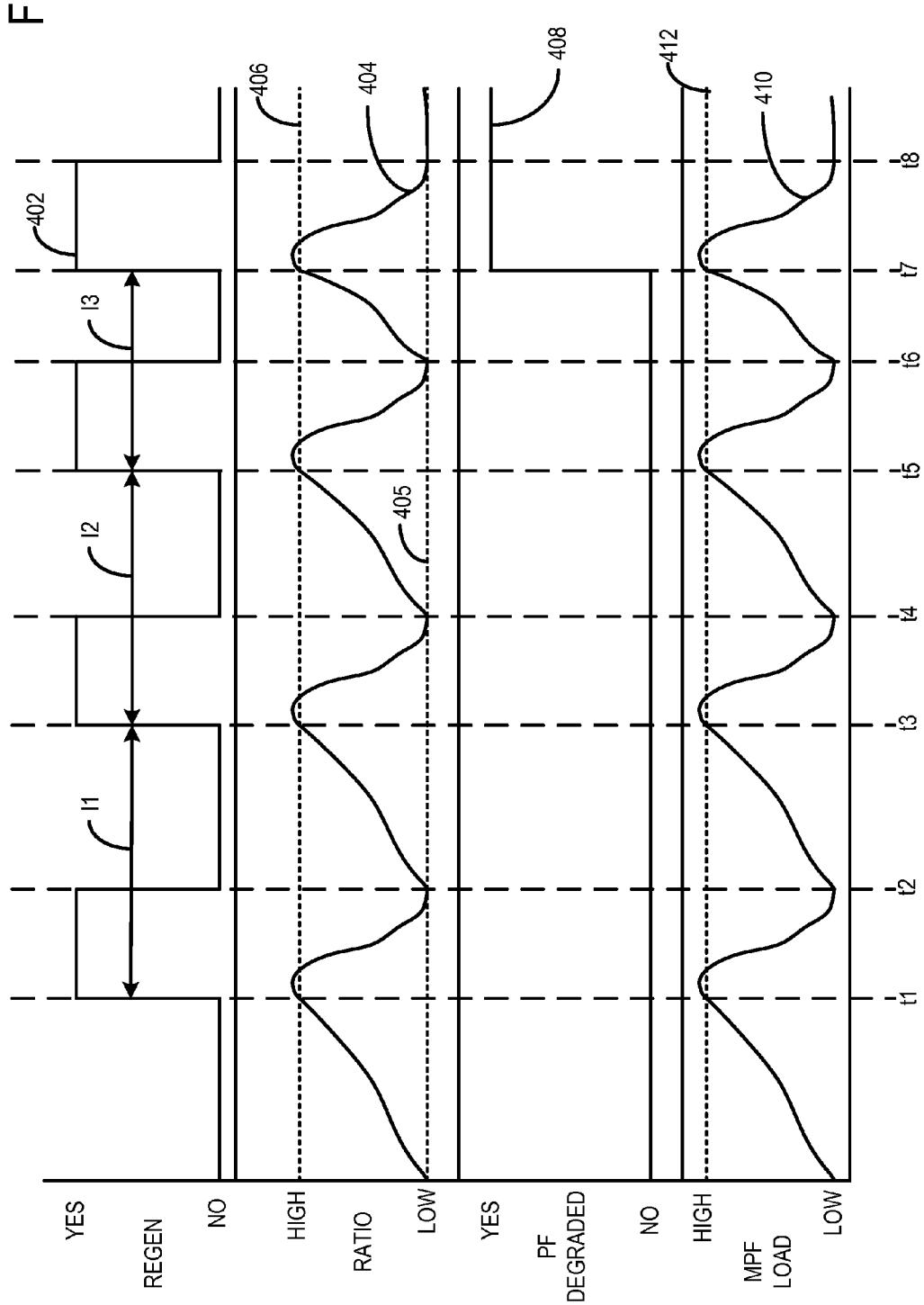

SYSTEM AND METHOD FOR DETECTING PARTICULATE FILTER LEAKAGE

FIELD

The present description relates generally to methods and systems for detecting leakage of a particulate filter (PF).

BACKGROUND/SUMMARY

Particulate matter filters are increasingly used in automotive emissions systems for reducing particulate concentrations in engine exhaust. When soot accumulates to a threshold level on the particulate filter, a filter regeneration process may be used to burn off the accumulated soot under controlled engine operating conditions. However, over time, such particulates filters can suffer irreversible decreases in trapping efficiencies as the filter develops cracks due to uncontrolled temperature excursion during the filter regeneration process. Losses in trapping efficiency of the particulate filter may result in increased particulate matter emissions well above the regulated limit.

Increasingly stringent particulate matter emissions standards and proposed government-mandated on-board diagnostic (OBD) requirements for monitoring the trapping efficiency of a particulate filter have stimulated much research into new techniques for monitoring particulate filter performance. One method includes determining a differential pressure across a particulate filter. If the differential pressure is less than a threshold differential pressure, then the particulate filter may be leaking. However, this method may not be suitable for detecting a failure of the filter due to interference effects from ash loading in the filter. Other methods to determine particulate filter leakage include utilizing a soot sensor, located downstream of a particulate filter, to monitor a soot load in exhaust flow and signaling when the soot load exceeds a soot threshold (e.g., the soot threshold may be based on a threshold amount of acceptable soot leakage based on particulate matter emissions).

However, the inventors herein have recognized potential issues with such systems. As one example, the soot sensor may have low sensitivity to leaked soot due to a relatively small portion of soot being deposited on the soot sensor. This may be due to an exhaust pipe geometry and/or poor mixing of the exhaust gas. Furthermore, large diesel particulates and/or water droplets may impinge onto surfaces of the soot sensor, altering the soot sensor reading.

In one example, the issues described above may be addressed by a method for diverting exhaust gas from an exhaust pipe to parallel first and second exhaust pathways outside the exhaust pipe. The second exhaust pathway includes a filter coupled to an electric circuit. The method further includes adjusting engine operation based on an estimated exhaust flow rate ratio of flow rates through the first and second exhaust pathways. The flow rates are based on pressure drops through respective venturi tubes of the first and second exhaust pathways. In this way, degradation of a particulate filter in an exhaust conduit may be accurately determined.

As one example, the parallel first and second exhaust pathway may be located downstream of the particulate filter in the exhaust conduit. As a number of regenerations of the particulate filter increases, the particulate filter may become degraded and an increasing amount of soot may travel downstream of the particulate filter. As a result, more soot may build up on the filter located in the second exhaust pathway and as a result, a backpressure may be introduced to the second exhaust pathway. The impedance of exhaust flow through the second exhaust pathway causes a ratio of flow through the first and second exhaust pathways to increase. Once the ratio reaches a threshold ratio, an electric circuit, electrically coupled to the filter in the second exhaust pathway, is used to regenerate the filter. Degradation of the particulate filter in the exhaust conduit may be indicated once a time interval between subsequent regenerations of the filter in the second exhaust pathway decreases to a time interval less than a threshold time interval.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 represents a method for determining degradation of a particulate filter in the exhaust pipe.

FIG. 4 represents a plot for monitoring a time interval between regenerations of a particulate filter in the secondary exhaust assembly.

DETAILED DESCRIPTION

Figure 1:
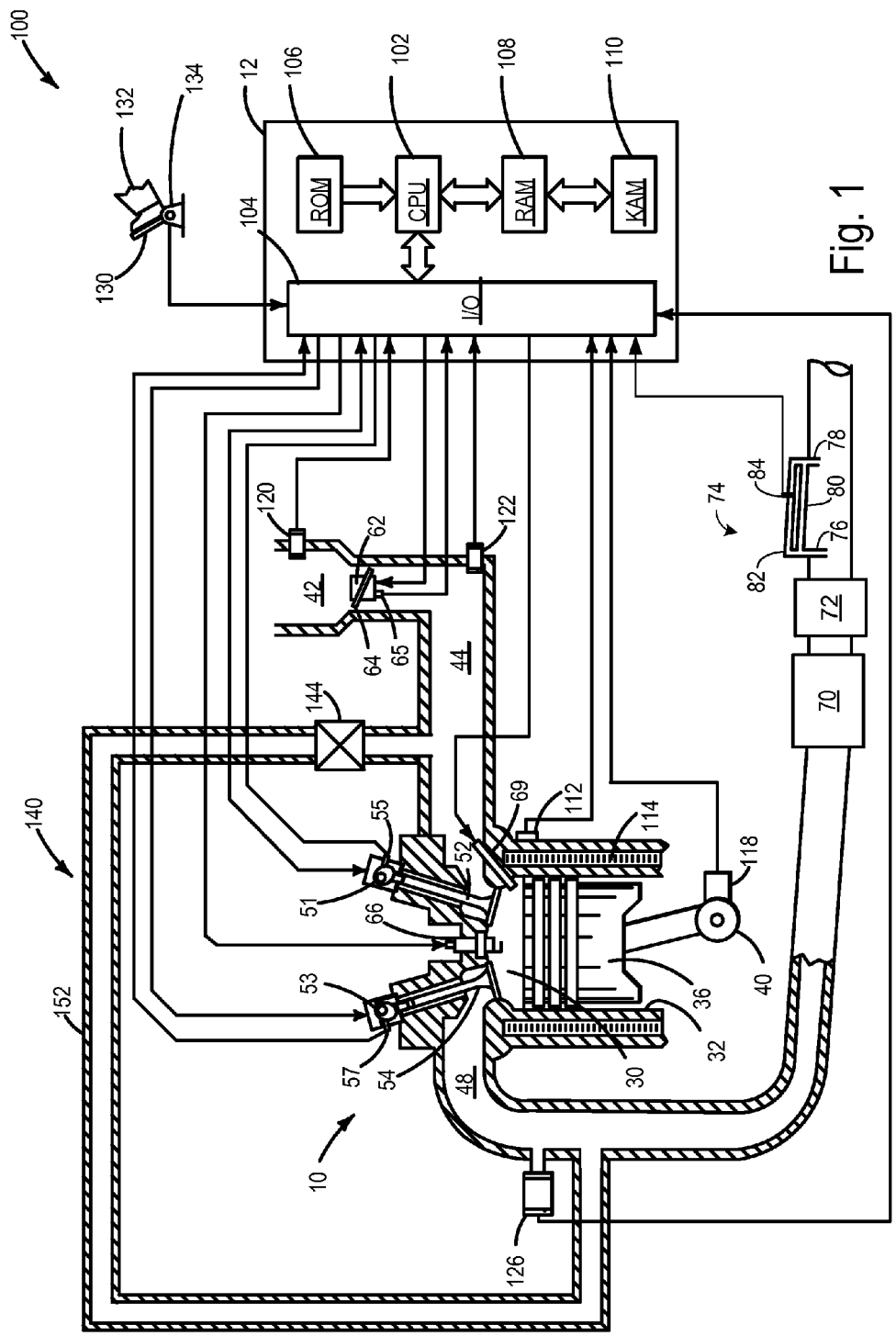
FIG. 1 represents an engine with a cylinder.
Figure 2:
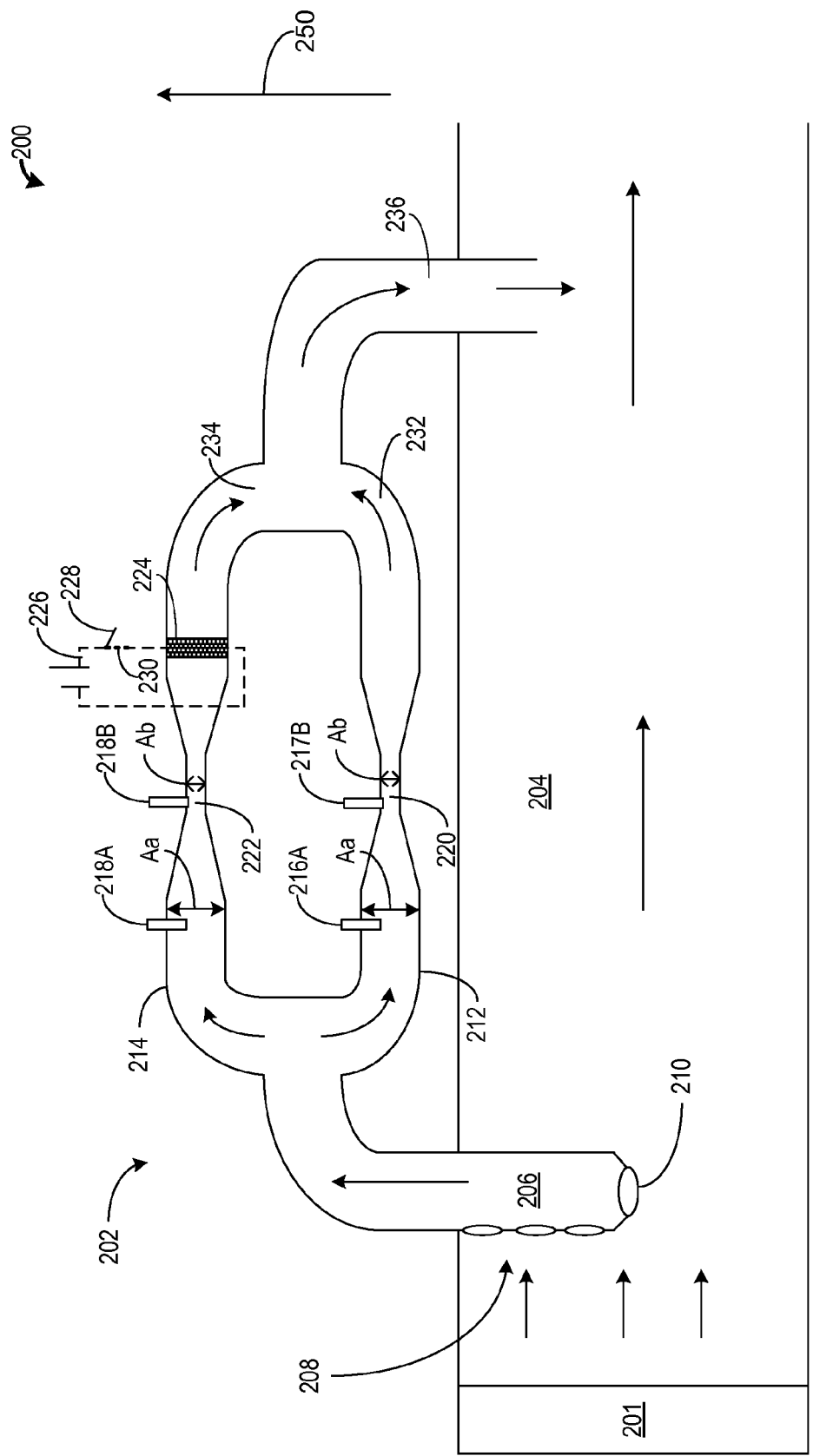
FIG. 2 represents a secondary exhaust assembly fluidly coupled to an exhaust pipe of the engine.

The following description relates to systems and methods for determining degradation of an engine particulate filter based on flow through a secondary exhaust assembly fluidly coupled to an exhaust pipe of an engine. A vehicle comprises an engine capable of impelling a vehicle via combustion, as shown in FIG. 1. The particulate filter and the secondary exhaust assembly are disposed along the exhaust pipe, where the particulate filter is positioned upstream of the secondary exhaust flow assembly. The secondary exhaust assembly comprises two parallel pathways, as shown in FIG. 2. A parallel first and second exhaust pathways are each located outside (e.g., exterior to) the exhaust pipe. The second pathway further comprises a metal filter capable of capturing soot in an exhaust flow external to the exhaust pipe. As the particulate filter in the exhaust pipe becomes degraded, it may leak a greater amount soot. The leaked soot may flow to the secondary flow assembly, where the metal filter may capture it. Over time, the metal filter may become fully loaded with soot. In response to the metal filter becoming fully loaded, the filter may be regenerated in order to remove the accumulated soot. Loading of the metal filter may be determined based on a ratio of exhaust flow through the first and second pathways, as shown in a method depicted in FIG. 3. The method of FIG. 3 further illustrates determining if the particulate filter in the exhaust pipe is degraded based on a time interval between a current regeneration and a prior regeneration of the metal filter. As described above, the particulate filter may become degraded after a threshold number of regenerations of the particulate filter (e.g., 1000). As a number of cracks and/or leakages develop in the particulate filter, soot may accumulate on the metal filter at an increased rate, thereby causing the metal filter regeneration time intervals to decrease. Changes in the metal filter regeneration time intervals over time are graphically displayed in FIG. 4.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage (e.g., exhaust pipe) 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of both an exhaust gas recirculation system 140 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

A particulate filter 72 is shown arranged along the exhaust passage 48 downstream of the emission control device 70. The particulate filter 72 may be a diesel particulate filter or a gasoline particulate filter. A material of the particulate filter 72 may be made or ceramic, silicon, metal, paper, or combinations thereof. During operation of the engine 10, particulate filter 72 may capture soot (e.g., unburned hydrocarbons) in order to reduce vehicle emissions. The soot clogs surfaces of the particulate filter and may create an exhaust backpressure. The exhaust backpressure may negatively influence the engine. Once the particulate filter 72 becomes fully loaded with soot (e.g., soot load on the particulate filter exceeds a soot load threshold), the backpressure may be too high for proper exhaust expulsion. Work used to expel exhaust from the engine 10 increases in order to overcome the backpressure described above. In order to avoid high backpressure, an engine 10 may regenerate the filter either passively or actively.

Passive regeneration may occur when an engine load exceeds a threshold load causing an exhaust temperature to rise. As the exhaust temperature increases beyond a threshold temperature (e.g., 450° C.), the soot on the particulate filter 72 may combust. Therefore, passive regeneration occurs without alterations to engine operations. Conversely, active regeneration occurs via the controller 12 signaling for alterations to engine operations in order to increase exhaust temperatures (e.g., late injection, secondary injection, throttling, exhaust recirculation, spark retard, and/or decrease air/fuel ratio) independent of the engine load.

As the soot burns during either passive or active regeneration, the particulate filter temperature increases to a high temperature (e.g., 1400° C.). The regeneration temperature may be difficult to control and when left to its own vices, the regeneration may degrade the particulate filter 72. Degradation may include the particulate filter 72 developing a leak (e.g., crack) and/or a hole, which may cause soot to flow further downstream in the exhaust passage 48, past the particulate filter 72, and increase vehicle emissions.

Other factors contributing to particulate filter degradation include vehicle vibrations and lubricating oil ash. Vehicle vibrations may degrade fragile components within the particulate filter 72 due to expansion of the components (i.e., decreased stability) caused by exposure of the particulate filter 72 to high temperatures. Lubricating oil ash may contain metal oxides which can react with the particulate filter 72 and form phases (e.g., portions of the particulate filter degrade while other portions remain functional), ultimately degrading at least a portion of the particulate filter.

A secondary flow assembly 74 is shown arranged along the exhaust passage 48 downstream of the particulate filter 72. The secondary flow assembly 74 comprises an inlet 76 positioned within the exhaust passage 48, at an end of the secondary flow assembly 74 nearest the particulate filter 72. The secondary flow assembly 74 further comprises an outlet 78 positioned within the exhaust passage 48, at an opposite end of the secondary flow assembly 74 farthest away from the particulate filter 72.

The inlet 76 and the outlet 78 are fluidly coupled to the exhaust conduit 48 and both of a first passage 80 and a second passage 82. The first passage 80 and the second passage 82 are parallel and substantially equal to one another in geometrical structure. The second passage 82 includes a metal filter 84, which is electronically coupled to the controller 12. The metal filter 84 is smaller than the particulate filter 72. Both the first passage 80 and the second passage 82 are located outside of the exhaust passage 48, but receive exhaust gas from the exhaust passage 48 via inlet 76. Said another way, the first passage 80 and second passage 82 are positioned external to an interior of the exhaust passage 48. The secondary flow assembly 74 may be used to determine degradation of the particulate filter 72. The secondary flow assembly will be discussed in more detail below with respect to FIGS. 2 and 3.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller 12. In one example, the controller 12 alters an engine operation to limit torque output of a vehicle in response to a signal received from the metal filter 84 of the second flow assembly 74.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1.

FIG. 1 depicts a single cylinder of an engine further comprising a particulate filter upstream of a secondary flow assembly. FIG. 2 depicts the secondary flow assembly in greater detail.

Turning now to FIG. 2, a system 200 depicts a secondary flow assembly 202 fluidly coupled to an exhaust conduit 204 downstream of a particulate filter 201. Solid line arrows indicate an example direction of exhaust flow. Secondary flow assembly 202, particulate filter 201, and exhaust conduit 204 may be used in the embodiment depicted in FIG. 1. As such, the secondary flow assembly 202, particulate filter 201, and exhaust conduit 204 may be examples of the secondary flow assembly 74, particulate filter 72, and exhaust passage 48 shown in FIG. 1

As described above, the particulate filter 201 is located upstream of the secondary flow assembly 202. Exhaust flow from engine cylinders passes through the particulate filter 201 and reaches the secondary flow assembly 202. At least a portion of the exhaust gas flowing through the exhaust conduit 204 flows from the exhaust conduit 204 into the secondary flow assembly 202 via an inlet 206. The inlet 206 includes one or more perforations 208 on a face of the inlet 206 nearest the particulate filter 201. The perforations 208 face a direction opposite a direction of exhaust gas flow. Said another way, the perforations 208 face the particulate filter 201 and the oncoming exhaust flow. The inlet 206 extends through at least a portion of and is perpendicular to the exhaust conduit 204. Said another way, the inlet 206 extends through an exterior wall of the exhaust conduit 204 and into an interior of the exhaust conduit 204. Additionally, a centerline of the inlet 206 is perpendicular to a centerline of the exhaust conduit 204 and a direction of exhaust flow through the exhaust conduit 204. Furthermore, all the perforations 208 are located within the exhaust conduit 204 on the inlet 206.

An orifice 210 is located on a bottom face of the inlet 206 within the exhaust conduit 204. The orifice 210 faces perpendicular to a direction of exhaust flow (e.g., a central axis of the orifice is perpendicular to the exhaust flow direction). Exhaust gas flows from the exhaust conduit 204 and into the inlet 206 via perforations 208. As exhaust flows through the inlet 206, it reaches a portion of the inlet 206 outside of the exhaust conduit 204. The portion of the inlet 206 outside of the exhaust conduit 204 is lower in temperature than the portion of the inlet 206 inside the exhaust conduit 204. Due to this temperature difference, water vapor in the exhaust gas may condense onto surfaces of the inlet 206. The condensate on the surfaces of the inlet 206 may fall through the orifice 210 and into the exhaust conduit 204. In this way, an amount of water flowing through the secondary flow assembly 202 is reduced.

Exhaust flows through the inlet 206 to a bifurcation of the second flow assembly 202. The bifurcated portion of the inlet 206 diverts exhaust flow to each of a first passage 212 and a second passage 214. The second passage 214 is positioned vertically higher than and above the first passage 212 with respect to a surface (e.g., ground) on which a vehicle in which the engine is installed sits. The vertical direction is depicted in FIG. 2 by arrow 250. Therefore, the second passage 214 is positioned farther from the ground than the first passage 212. Said another way, the first passage 212 is closer to the exhaust conduit 204 than the second passage 214. In some embodiments, the first passage 212 and second passage 214 may be substantially equal in a distance from the ground, but unequal in distance from an exhaust conduit, in which the second passage 214 is farther away from the exhaust conduit that the first passage 212. In other words, the first and second passages 212 and 214 may be manufactured such that they are horizontally disposed with the second passage 214 being farther away from the exhaust conduit 204 than the first passage 212. Additionally or alternatively, the first passage 212 is proximal to the exhaust conduit 204 while the second passage 214 is distal to the exhaust conduit 204.

By positioning the second passage 214 vertically above the first passage 212, with respect to ground, a greater portion of exhaust gas may flow into the first passage 212 compared to a remaining portion of exhaust gas flowing into the second passage 214. A greater portion of exhaust gas may flow into the first passage 212 because it is energetically favorable for the exhaust gas to flow with gravity (e.g., toward the first passage 212) rather than flow against gravity (e.g., toward the second passage 214).

Both the first passage 212 and the second passage 214 are located outside of the exhaust conduit 204. The first passage 212 and the second passage 214 run in a direction parallel to the exhaust conduit 204. For example, exhaust flow through the first passage 212 and second passage 214 is parallel to exhaust flow through the exhaust conduit 204. The first passage 212 and the second passage 214 both comprise delta pressure sensors 216A and 216B and 218A and 218B, respectively. Delta pressure sensor 216A is located upstream of a first venturi passage 220 in the first passage 212, while corresponding delta pressure sensor 216B is located within the first venturi passage 220. Likewise, delta pressure sensor 218A is located upstream of a second venturi passage 222 in the second passage 214, while corresponding delta pressure sensor 218B is located within the second venturi passage 222. First venturi passage 220 is substantially identical to second venturi passage 222 such that a pressure drop across the venturi passages and increase in flow velocity through the venturi passages are substantially equal for the first and second venturi passages 220 and 222, respectively.

A flow rate through the first venturi passage 220 and second venturi passage 222 may be calculated via Equation 1 depicted below.

$$Q = C \sqrt{\frac{2\Delta p}{\rho} * \frac{A_a}{\sqrt{\left(\frac{A_a}{A_b}\right)^2 - 1}}} \quad \text{Equation 1}$$

In equation 1, Q represents a flow rate of exhaust gas through either the first passage 212 or the second passage 214. The following description is for the first passage 212. Calculating Q for the second passage 214 is substantially the same. A change in pressure ($\Delta p$) is based on a difference between a pressure measured at the pressure sensor 220 and a known pressure of the first venture passage 220. Density ($\rho$) is estimated for a gas in the second flow assembly based on current engine conditions (e.g., intake air temperature, load, pressure, etc.). Aa and Ab represent cross-sectional areas as indicated in the FIG. 2.

Based on a difference in pressure (p) measured by delta pressure sensor 216A and delta pressure sensor 216B, a change in pressure ($\Delta p$) may be calculated. The pressure at either of the delta pressure sensors 216A, 216B is variable based on an amount of exhaust flowing into the first passage 212. As the exhaust flow to the first passage 212 increases, the pressure at the delta pressure sensors 216A, 216B increases. However, the increase at each of the delta pressure sensors 216A and 216B may not be equal (e.g., a pressure increase at delta pressure sensor 216A may be greater than a pressure increase at delta pressure sensor 216B). A pressure of exhaust gas in the first passage 212 is higher than a pressure of exhaust gas in the second passage 214 because the first passage 212 receives more exhaust gas than the second passage 214, due to reasons described above.

A density ($\rho$) of the exhaust gas at the delta pressure sensor 216A may be calculated based on a manipulation of the ideal gas law. Furthermore, under confines of the ideal gas law, the density of the exhaust gas may be assumed to be constant (e.g., an incompressible gas). The density calculated is dependent upon a pressure and temperature of the exhaust gas, where the density increases as the pressure increases and the density decreases as the temperature increases.

Aa represents a cross-sectional area of the first passage 212 or the second passage 214 near the delta pressure sensor 216A or the delta pressure sensor 218A, respectively and is based on a diameter (e.g., passage diameter) of the first passage 212 or second passage 214 before decreasing to the diameter of the venturi passage. Ab represents a cross-sectional area of the narrowest portion of the first venturi passage 220 or the second venturi passage 222 (and is thus based on a diameter of the venturi passages) near the delta pressure sensor 216B or 218B, respectively. C represents a constant calculated based on the first passage 212 geometry. It will be appreciated that values Aa, Ab, and C are equal for both the first passage 212 and the second passage 214 due to substantially identical geometries of the first passage 212 and the second passage 214.

Calculating the flow rate through the first venturi passage 220 and second venturi passage 222 is similar and therefore, for reasons of brevity, a description of calculating the flow rate through the first venturi passage 220 may be applied to the second venturi passage 222 as well.

In order to calculate the flow rate (Q), pressure (p) and air density ($\rho$) are determined based on measured parameters, while C, Aa, and Ab are known variables (e.g., based on known geometries). As can be seen by equation 1, flow rate through a venturi passage, Q, increases as pressure upstream of the venturi passage, p, increases. Similarly, Q decreases as p increases.

As an example, for a vehicle driving at 40 miles per hour (mph), the density (ρ) of air is known based on an engine load and intake air temperature. As described above, C is a constant value determined based on a geometry of the passage. The first passage 212 is substantially identical to the second passage 214, therefore their C values may also be substantially identical. Areas $A_a$ and $A_b$ are known.

The difference in pressure (p) may be calculated based on a difference between pressures measured at delta pressure sensor 216A and delta pressure sensor 216B. Likewise for the second passage, the pressure difference may be calculated based on a difference between pressures measured at delta pressure sensor 218A and delta pressure sensor 218B. As described above, the pressure of the first passage 212 is greater than the pressure of the second passage 214. Therefore, all values of equation 1 may be equal for the first passage 212 and the second passage 214 except for the delta pressure. The flow rate (Q) is estimated based on the above described values. Furthermore, Q is proportional to one or more of the p and ρ, as described above. The flow rate estimated for the first passage 212 is herein referred to as $Q_1$ and the flow rate estimated for the second passage 214 is herein referred to as $Q_2$.

Exhaust flowing out of the second venturi passage 222 flows into a metal filter 224 downstream of the second venturi passage 222. The first passage 212 does not comprise a metal filter downstream of venture passage 220. The metal filter 224 is capable of capturing soot in the exhaust gas flow. The metal filter 224 is disposed across an internal diameter of the second passage 214. Considering the particulate filter 201 is upstream of the secondary flow device 202, soot in the exhaust gas flow is a result of soot that has passed through the particulate filter 201. Therefore, soot in the exhaust gas flow may increase as the particulate filter 201 captures less soot and/or develops cracks or leaks.

The metal filter 224 is not the same as the particulate filter 201. The metal filter 224 is smaller than the particulate filter 201. The metal filter 224 is located outside of the exhaust conduit 204 while the particulate filter 201 is housed within the exhaust conduit 201. Furthermore, the metal filter 224 receives less exhaust flow than the particulate filter 201. The particulate filter 201 is upstream of the metal filter 224 with regard to exhaust flow.

The metal filter 224 is electrically coupled to a circuit 226 (depicted by a large dashed box) with a switch 228, whereas the particulate filter 201 is not electrically coupled to a circuit. The switch 228 may be in an open position (indicated by a solid line) or in a closed position 230 (indicated by a bold, small dashed line). When the switch 228 is in the closed position 230, the circuit 226 is complete and electrical current runs through the metal filter 224. Flowing electrical current through the metal filter 224 increases a temperature of the metal filter 224 in order to regenerate the metal filter 224 (e.g., burn soot captured by the metal filter 224 off the filter).

When the switch 228 is in the open position, the circuit 226 is incomplete and electrical current does not flow through the metal filter 224. The switch 228 transitions between the open position and closed position based on a ratio of $Q_1$ to $Q_2$ (e.g., flow rate through the first passage 212: flow rate through the second passage 214) being less than a threshold ratio or greater than the threshold ratio respectively. The threshold ratio may be a fixed number (e.g., 3). Alternatively, the threshold ratio may be altered based on engine operation (e.g., the threshold ratio increases as an engine load increases). $Q_2$ decreases as the metal filter 224 becomes increasingly fouled (e.g., a soot load of the metal filter 224 increases). An exhaust backflow increases as the soot load increases, which decreases $Q_2$. The ratio, $Q_1$:$Q_2$, increases as $Q_1$ increases or $Q_2$ decreases. The passage flow ratio $Q_1$:$Q_2$ will be described in greater detail with respect to FIGS. 3 and 4.

Exhaust flows through the metal filter 224 and flows into a second passage outlet 234. Exhaust flowing in the second passage outlet 234 may have a lower pressure than exhaust flowing upstream of the second venturi passage near the pressure sensor 218A.

Exhaust flows out of the first venturi passage 220 and into a first passage outlet 232. Exhaust flowing in the first passage outlet 232 may have a lower pressure than exhaust flowing upstream of the first venturi passage 220 near the pressure sensor 216A.

Exhaust from both the first passage outlet 232 and the second passage outlet 234 merge at an area of confluence (e.g., a bifurcated portion) of an outlet 236. A first portion of the outlet 236 is located outside the exhaust conduit 204 while a second portion of the outlet 236 is located inside the exhaust conduit 204. The outlet 236 protrudes perpendicularly into the exhaust conduit 204. As depicted, exhaust flowing from the outlet 236 and into the exhaust conduit 204 flows perpendicular to an exhaust flow in the exhaust conduit 204. Alternatively, the outlet 236 may comprise a bend in the exhaust conduit 204 such that exhaust gas flowing from the outlet 236 and into the exhaust conduit 204 flows parallel to the exhaust flow in the exhaust conduit 204. The outlet 236 may have a diameter substantially equal to a diameter of the inlet 206.

FIG. 2 illustrates a secondary flow device fluidly coupled to an exhaust conduit. FIG. 3 depicts a method for determining a particulate filter leakage in the exhaust conduit based on a regeneration time interval being less than a threshold time interval.

Turning now to FIG. 3, a method 300 is shown for determining if a particulate filter in an engine exhaust passage is degraded (e.g., leaking and/or burned up) via comparing a regeneration time interval of a metal filter of a secondary flow device to a threshold time interval. Instructions for carrying out method 300 may be executed by a controller (e.g., controller 12 shown in FIG. 1) based on instructions stored on a memory of the controller and in conjunction with signals received from various sensors of the engine system, such as the sensors described above with reference to FIGS. 1 and 2. The controller may employ engine actuators of the engine system to adjust engine operation, according to the methods described below.

Method 300 may be described with reference to components described above, more specifically, with reference to engine 10, controller 12, particulate filter 201, secondary flow assembly 202, and exhaust conduit 204 with respect to FIGS. 1 and 2.

Method 300 begins at 302 to determine, estimate, and/or measure current engine operating parameters. Current engine operating parameters may include an engine load, engine speed, vehicle speed, manifold vacuum, throttle position, exhaust pressure, and an air/fuel ratio.

At 304, the method 300 includes determining a ratio of a flow rate of a first passage in a secondary exhaust passage (e.g., flow rate $Q_1$ of the first passage 212 in the secondary flow assembly 202) and a flow rate of a second passage in the secondary flow assembly (e.g., flow rate $Q_2$ of the second passage 214 in the secondary flow assembly 202). The flow rates are calculated using equation 1, as described above. The ratio increases as $Q_1$ increases and/or as $Q_2$ decreases. Therefore, the ratio decreases as $Q_1$ decreases and/or as $Q_2$ increases. As described above, the first passage receives a greater amount of exhaust than the second passage and as a result, $Q_1$ is greater than $Q_2$. Further, as soot deposition on a metal filter (e.g., metal filter 224) in the second passage in the secondary flow assembly increases, the ratio of $Q_1$ to $Q_2$ increases. As such, this flow ratio may be used to infer an amount of soot loading on the metal filter.

At 306, the method 300 includes determining if the ratio is greater than a threshold ratio. The threshold ratio may be based on a desired flow rate through the second passage based on engine conditions determined above, where the ratio may be adjusted dependent upon a value of the engine condition. For example, the threshold ratio may increase as engine load increases. Alternatively, the threshold ratio may be a fixed ratio. The metal filter may be not fouled or may be partially fouled (e.g., soot load is less than a threshold soot load) when a soot load of the metal filter is less than a threshold soot load and exhaust flow through the metal filter is at a desired rate (e.g., 0.002 kg/s). If the soot load exceeds the threshold soot load, then a backpressure arises, capable of reducing $Q_2$ to a less than desired value (i.e., increasing the ratio calculated at 304).

If the ratio is less than the threshold ratio, then the method 300 proceeds to 308 to maintain current engine operations and continue monitoring the ratio of the first passage and second passage flow rates. The method 300 also maintains a circuit electrically coupled to the metal filter to remain open. For example, a controller 12 signals to maintain switch 228 of circuit 226, as shown in FIG. 2, open such that a regeneration of the metal filter 224 does not occur.

If the ratio is greater than the threshold ratio, then the method 300 proceeds to 310 to close the electric circuit in order to regenerate the metal filter. For example, controller 12 signals to actuate switch 228 of circuit 226 to a closed position in order to complete the circuit 226. The circuit 226 is able to flow electricity through the metal filter 224 and regenerate the filter when the circuit 226 is complete (e.g., closed). As described above, by closing the switch of the circuit, the metal filter heats up and effectively burns the captured soot from the filter.

The switch remains in the closed position until the regeneration is complete. A complete regeneration may be based on the flow rate ratio being less than the second threshold ratio. Once the ratio is lower than the second threshold ratio, the switch returns to the open position and the regeneration is terminated (e.g., electricity no longer flows through the metal filter. In some embodiments, additionally or alternatively, the regeneration may be terminated after a set duration of time (e.g., 20 seconds). The duration of time may be based on an average amount of regeneration time used to decrease the ratio to below the threshold ratio. Alternatively, the regeneration may be complete once the flow rate ratio reaches a second threshold regeneration ratio that is lower than the threshold ratio described above (e.g., first threshold ratio). The second threshold regeneration ratio is a lower ratio corresponding to an unloaded filter and the threshold ratio (e.g., at 306) is a higher ratio corresponding to a loaded filter.

At 312, the method includes determining a time interval between a last regeneration and a current regeneration of the metal filter. The last regeneration is defined as a regeneration event that occurred directly before the current regeneration event. The time interval may be calculated based on a duration of time between initiation of the last regeneration and initiation of the current regeneration (e.g., 120 minutes). A time interval may be less than a previous time interval as a particulate filter in an exhaust conduit (e.g., particulate filter 201) becomes degraded and captures less soot. For example, the particulate filter develops leaks, which may allow a greater amount of soot to flow to the metal filter, resulting in more frequent regenerations of the metal filter.

At 314, the method 300 determines if the measured time interval is less than a threshold time interval. The threshold time interval may be based on a set threshold (e.g., 200 minutes), a last time interval measured, or a percentage of the last time interval measured (e.g., 50% of the last time interval). Further, the threshold time interval may be based on a threshold that indicates that the time interval is decreasing and the metal filter has to be regenerated at an increasing rate. Additionally or alternatively, the threshold time interval may be adjusted based on engine operating parameters. For example, the threshold time interval may be decreased as an engine load increases.

If the time interval is not less than the threshold time interval, then the method 300 proceeds to 308 to maintain current engine operation and continue monitoring the ratio of the first passage and the second passage.

If the time interval is less than the threshold time interval, then the method 300 proceeds to 316 to indicate the particulate filter of the exhaust conduit, upstream of the metal filter in the secondary flow assembly, is leaking Indication of the particulate filter leaking includes adjusting an engine operation and activating an indicator lamp 318 (e.g., in order to indicate to a vehicle operator that the particulate filter is degraded and needs to be replaced).

As an example, a controller (e.g., controller 12) may signal various actuators of an engine (e.g., throttle 62 of engine 10) to limit a torque output of the engine in order to reduce exhaust produced to meet emissions standards. As another example, additionally or alternatively, the method 300 may advance one or more of a spark timing and fuel injection, increase air/fuel ratio, and/or increase EGR. By increasing EGR flow to one or more cylinders of the engine, a combustion mixture temperature(s) is decreased and a volume of fuel injection may be decreased. By doing this, an amount of soot being exhausted from one or more cylinders of the engine may be decreased.

In one embodiment, additionally or alternatively, during a first condition when particulate filter regeneration conditions are met and in response to the time interval (e.g., the time interval determined at 312) being greater than the threshold time interval, the particulate filter in the engine exhaust conduit may be regenerated via one or more of retarding spark and decreasing an air/fuel ratio. During a second condition and in response to the time interval being less than the threshold time interval, a controller (e.g., controller 12) may indicate degradation of the particulate filter to an operator and adjust an engine actuator to reduce a torque output.

Thus, the method of FIG. 3 provides for a method comprising diverting exhaust gas from an exhaust pipe to parallel first and second exhaust pathways outside the exhaust pipe, where the second exhaust pathway includes a filter coupled to an electric circuit. The method includes adjusting engine operation based on an estimated flow rate ratio of flow rates through the first and second exhaust pathways. The flow rates are based on pressure drops through respective venturi tubes of the first and second exhaust pathways.

FIG. 4 depicts an operating sequence 400 illustrating example results for an engine operating with a secondary flow assembly (e.g., such as the secondary flow assembly 202 shown in FIG. 2). Line 402 represents if a metal filter of the secondary flow assembly is regenerating or not, line 404 represents a ratio of flow rates of the secondary flow assembly (e.g., $Q_1:Q_2$, as described above), dotted line 405 represents a threshold regeneration flow rate ratio, and dotted line 406 represents a threshold flow rate ratio, line 408 represents if a particulate filter in an exhaust pipe fluidly coupled to and upstream of the secondary flow assembly is degraded, and line 410 represents a metal filter soot load 410 and line 412 represents a threshold soot load of the metal filter. Double headed arrows I1, I2, and I3 represent measured time intervals between a last regeneration and a current regeneration of the metal filter. The horizontal axes of each plot represent time and time increases from the left side of the figure to the right side of the figure.

FIG. 4 is illustrative by nature and time intervals between regenerations of the metal filter may be greater than or less than the time intervals depicted. Additionally or alternatively, degradation of the particulate filter in the exhaust pipe may occur over a threshold mileage (e.g., 25,000 miles).

Prior to t1, the metal filter is not being regenerated, as indicated by line 402. The flow rate ratio of the secondary flow assembly is less than the threshold flow rate flow rate ratio, as shown by lines 404 and 406 respectively. The particulate filter located in the exhaust pipe is not degraded, as shown by line 408. The metal filter soot load is relatively low and below the threshold soot load, as indicated by lines 410 and 412. As depicted, the flow rate ratio and the metal filter soot load are substantially identical because the flow rate ratio increases as the metal filter soot load increases, as described above. Thus, the flow rate ratio of the second exhaust passage is dependent upon the metal filter soot load. Both the flow rate ratio and the metal filter soot load increase. Thus, the flow rate ratio can be used as an indicator of soot loading of the filter.

At t1, the metal filter soot load exceeds the threshold soot load and the flow rate ratio exceeds the threshold flow rate. In response, a switch of an electrical circuit electrically coupled to the metal filter closes in order to initiate regeneration of the metal filter. The particulate filter in the exhaust pipe is not degraded.

After t1 and prior to t2, the regeneration of the metal filter continues. As the filter regenerates, soot is burned off the filter and consequently the flow rate ratio and soot load decrease. As described above, the regeneration may terminate after a predetermined amount of time or it may terminate based on the flow rate ratio decreasing below the threshold regeneration flow rate ratio, as shown at 405, which is lower than the threshold flow rate ratio shown at 406. In the example of operating sequence 400, the regeneration occurs for a predetermined amount of time (e.g., 20 seconds). As the regeneration takes place, the flow rate ratio and the metal filter soot load decrease to a relatively low rate and load, respectively. The particulate filter in the exhaust pipe is not degraded.

At t2, the regeneration of the metal filter is terminated via actuating the switch of the electric circuit to an open position, as described above. The particulate load on the metal filter begins to increase (e.g., soot is captured onto the metal filter without being burned). Additionally, the flow rate ratio begins to increase. The particulate filter in the exhaust pipe is not degraded.

After t2 and prior to t3, the flow rate ratio and the metal filter soot load continue to increase to a relatively high ratio and high load respectively. The regeneration remains terminated. The particulate filter in the exhaust pipe is not degraded.

At t3, the metal filter soot load exceeds the threshold soot load and the flow rate ratio exceeds the threshold flow rate. In response, regeneration of the metal filter is initiated. During the course of the metal filter regeneration, the time interval between the start of the current metal filter regeneration and the start of the last metal filter regeneration is measured, as shown by I1. I1 measures a time interval between t1 and t3. If the time interval is less than a threshold time interval then the particulate filter of the exhaust pipe may be degraded, as described above. In this example, I1 is greater than the threshold time interval (e.g., two thirds of a previous regeneration) and the particulate filter in the exhaust pipe is not degraded. The time interval in the example of the figure is depicted as a threshold amount of time. As described above, the time interval may vary based on engine conditions or may be based on previous time intervals between subsequent regenerations After t3 and prior to t4, the regeneration of the metal filter continues. As the regeneration takes place, the flow rate ratio and the metal filter soot load decrease to a relatively low rate and relatively low load, respectively At t4, the regeneration of the metal filter is terminated, due to the flow rate ratio being less than the threshold regeneration flow rate ratio, via actuating the switch of the electric circuit to an open position, as described above. The particulate load on the metal filter begins to increase (e.g., soot is captured onto the metal filter without being burned). Additionally, the flow rate ratio begins to increase.

After t4 and prior to t5, the flow rate ratio and the metal filter soot load continue to increase to a relatively high ratio and high load respectively. The regeneration remains terminated.

At t5, the metal filter soot load exceeds the threshold soot load and the flow rate ratio exceeds the threshold flow rate. In response, regeneration of the metal filter is initiated. I2 is measured similar to the measurement of I1, except it measures a time interval between t5 and t3. I2 is greater than the threshold time interval and the particulate filter in the exhaust pipe is not degraded.

After t5 and prior to t6, the regeneration of the metal filter continues. As the regeneration takes place, the flow rate ratio and the metal filter soot load decrease to a relatively low rate and relatively low load, respectively.

At t6, the regeneration of the metal filter is terminated via actuating the switch of the electric circuit to an open position in response to the flow rate ratio decreasing below the threshold flow rate ratio, as described above. The particulate load on the metal filter begins to increase (e.g., soot is captured onto the metal filter without being burned). Additionally, the flow rate ratio begins to increase.

After t6 and prior to t7, the flow rate ratio and the metal filter soot load continue to increase to a relatively high ratio and high load respectively. The regeneration remains terminated.

At t7, the metal filter soot load exceeds the threshold soot load and the flow rate ratio exceeds the threshold flow rate. In response, regeneration of the metal filter is initiated. I3 measures a time interval between t7 and t5. I3 is less than the threshold time interval and thus, the particulate filter in the exhaust pipe is degraded, as depicted by line 408. A controller may indicate degradation of the particulate filter disposed upstream of the parallel first and second exhaust pathways in the exhaust pipe in response to the time interval decreasing below the threshold time interval. Furthermore, the controller (e.g., controller 12) may adjust engine operation in response to the degraded particulate filter. The adjustments may include one or more of turning on an indicator lamp and limiting a vehicle torque output, as described above with respect to FIG. 3.

After t7, and prior to t8, the regeneration of the metal filter continues. As the regeneration takes place, the flow rate ratio and the metal filter soot load decrease to a relatively low rate and relatively low load, respectively. The particulate filter in the exhaust pipe remains degraded.

At t8, the regeneration of the metal filter is terminated via actuating the switch of the electric circuit to an open position in response to the flow rate ratio decreasing below the threshold flow rate ratio, as described above. The particulate load on the metal filter stays low due to the adjustments made by the controller in order to decrease soot output. Therefore, the flow rate ratio remains low.

After t8, the adjustments are maintained and the metal filter load and the flow rate ratio remain at relatively low values. The particulate filter in the exhaust conduit remains degraded.

In this way, by diverting a portion of exhaust gas from an exhaust conduit to a secondary flow assembly, a metal filter in the secondary flow assembly may be used to determine degradation of a particulate filter in the exhaust conduit, upstream of the secondary flow assembly. Additionally, by placing the metal filter in the secondary flow assembly, deposition uniformity on the metal filter is increased compared to placement in the exhaust conduit. Thus, sensitivity of the metal filter is increased and the particulate filter in the exhaust conduit may be more accurately determined as degraded or not degraded. The technical effect of flowing exhaust to the secondary flow assembly toward a metal filter is to determine a condition of a particulate filter (e.g., degraded or not degraded) in order to meet an emissions standard. A flow rate ratio may be determined for exhaust gas flowing through a first passage without a metal filter and a second passage with a metal filter in the secondary flow assembly. The flow rate ratio may infer soot loading on the metal filter and when the flow rate ratio is less than a threshold flow rate ratio, the metal filter may be fully loaded with soot and demand a regeneration. Measuring the flow rate ratio may be more accurate than using a soot sensor due to uneven soot deposit on the soot sensor leading to inaccurate determinations of a state of the particulate filter in the exhaust conduit. As a time interval between initiation of subsequent regenerations decreases, the particulate filter in the exhaust conduit may be indicated as being degraded.

A method comprising diverting exhaust gas from an exhaust pipe to parallel first and second exhaust pathways outside the exhaust pipe. The second exhaust pathway includes a filter coupled to an electric circuit. Adjusting the engine operation based on an estimated exhaust flow rate ratio of flow rates through the first and second exhaust pathways, where the flow rates are based on pressure drops through respective venturi tubes of the first and second exhaust pathways. The method, further comprising, regenerating the filter is in response to the estimated exhaust flow rate ratio being greater than a threshold ratio. Additionally or alternatively, regenerating the filter includes closing a switch of the electric circuit and flowing electricity through the filter. Adjusting the engine operation is further based on a time interval between subsequent first and second regeneration events of the filter being less than a threshold time interval. The time interval is measured from an initiation of the first regeneration event to an initiation of the second regeneration event. The method, additionally or alternatively, further includes indicating degradation of a particulate filter disposed upstream of the parallel first and second exhaust pathways in the exhaust pipe in response to the time interval decreasing below the threshold time interval.

The method, additionally or alternatively, further includes the exhaust pipe is fluidly coupled to the first and second exhaust pathways via an inlet pipe and an outlet pipe of the first and second exhaust pathways. The inlet pipe comprises one or more perforations on a portion of the inlet pipe disposed inside an interior of the exhaust pipe and a bifurcation on a portion of the inlet pipe disposed outside the exhaust pipe. The first exhaust pathway is positioned closer to the exhaust pipe than the second exhaust pathway, wherein each of the first exhaust pathway and the second exhaust pathway is parallel to the exhaust pipe, wherein each of the first and second exhaust pathways comprise a venturi passage, and wherein a geometry of the first and second exhaust pathways is substantially the same. Each of the first and second exhaust pathways comprise a pressure sensor disposed upstream of the respective venturi passage and further comprising estimating the estimated exhaust flow rate ratio of flow rates through the first and second exhaust pathways based on a first pressure upstream of a first venturi passage of the first exhaust pathway and a second pressure upstream of a second venturi passage of the second exhaust pathway.

A method comprising adjusting engine operation based on degradation of a particulate filter in an engine exhaust conduit. The degradation is determined based on a time interval between a first regeneration and a second regeneration of a metallic filter positioned in one of two parallel passages coupled to and positioned outside of the engine exhaust conduit. The two parallel passages are positioned downstream of the particulate filter and each including a venturi passage. An inlet and outlet of the two parallel passages are coupled to the engine exhaust conduit downstream of the particulate filter and wherein the two parallel passages includes a first passage including a first venturi passage and a second passage including a second venturi passage. The first passage is disposed proximal to the engine exhaust conduit relative to the second passage and where the second passage is disposed distal to the engine exhaust conduit relative to the first passage. The second passage includes the metallic filter, the metallic filter positioned downstream of the second venturi passage. Additionally or alternatively, regenerating the metallic filter is in response to an exhaust flow ratio of a first flow rate through the first passage and a second flow rate through the second passage being greater than a threshold exhaust flow ratio. The metallic filter is disposed across an internal diameter of the second passage and further comprising determining the first flow rate based on a pressure drop across the first venturi passage and determining the second flow rate based on a pressure drop across the second venturi passage.

The method, additionally or alternatively, further includes a first condition when particulate filter regeneration conditions are met and in response to the time interval being greater than a threshold time interval, regenerating the particulate filter in the engine exhaust conduit via one or more of a retarding spark and decreasing an air/fuel ratio when particulate filter regeneration conditions are met. During a second condition and in response to the time interval being less than the threshold time interval, indicating to an operator degradation of the particulate filter and adjusting an engine actuator to reduce torque output.

A system comprising an exhaust conduit comprising a particulate filter, a bifurcated passage positioned outside the exhaust conduit, with an inlet and outlet of the bifurcated passage coupled to the exhaust conduit downstream of the particulate filter, the bifurcated passage leading to parallel first and second tubes, where the second tube includes a second filter coupled to an electric circuit; and a controller with computer readable instructions stored thereon for estimating an exhaust flow rate ratio of flow rates through the first tube and the second tube, regenerating the second filter when the exhaust flow rate ratio is greater than a threshold ratio, and adjusting engine operation based on a time difference between subsequent regenerations of the second filter being less than a threshold time difference. The filter is a metal filter and the electric circuit includes a switch and wherein regenerating the second filter includes closing the switch to increase a temperature of the second filter and burn soot from the second filter. The first tube and second tube each comprise a venturi passage, and where the second filter is disposed downstream of a second venturi passage of the second tube.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    diverting exhaust gas from an exhaust pipe to parallel first and second exhaust pathways outside the exhaust pipe, where the second exhaust pathway includes a filter coupled to an electric circuit; and
    adjusting engine operation based on an estimated exhaust flow rate ratio of flow rates through the first and second exhaust pathways, the flow rates based on pressure drops through respective venturi tubes of the first and second exhaust pathways.

2. The method of claim 1, wherein the exhaust pipe is fluidly coupled to the first and second exhaust pathways via an inlet pipe and an outlet pipe of the first and second exhaust pathways.

3. The method of claim 2, wherein the inlet pipe comprises one or more perforations on a portion of the inlet pipe disposed inside an interior of the exhaust pipe and a bifurcation on a portion of the inlet pipe disposed outside the exhaust pipe.

4. The method of claim 1, wherein the first exhaust pathway is positioned closer to the exhaust pipe than the second exhaust pathway, wherein each of the first exhaust pathway and the second exhaust pathway is parallel to the exhaust pipe, wherein each of the first and second exhaust pathways comprise a venturi passage, and wherein a geometry of the first and second exhaust pathways is substantially the same.

5. The method of claim 4, wherein each of the first and second exhaust pathways comprise a pressure sensor disposed upstream of the respective venturi passage and further comprising estimating the estimated exhaust flow rate ratio of flow rates through the first and second exhaust pathways based on a first pressure upstream of a first venturi passage of the first exhaust pathway and a second pressure upstream of a second venturi passage of the second exhaust pathway.

6. The method of claim 1, further comprising regenerating the filter in response to the estimated exhaust flow rate ratio being greater than a threshold ratio.

7. The method of claim 6, wherein regenerating the filter includes closing a switch of the electric circuit and flowing electricity through the filter.

8. The method of claim 6, wherein adjusting engine operation is further based on a time interval between subsequent first and second regeneration events of the filter being less than a threshold time interval.

9. The method of claim 8, wherein the time interval is measured from an initiation of the first regeneration event to an initiation of the second regeneration event.

10. The method of claim 8, further comprising indicating degradation of a particulate filter disposed upstream of the parallel first and second exhaust pathways in the exhaust pipe in response to the time interval decreasing below the threshold time interval.

11. A method, comprising:
    operating an engine to regenerate a metallic filter positioned in one of two parallel passages coupled to and positioned outside of an engine exhaust conduit, the two parallel passages positioned downstream of a particulate filter and each including a venturi passage;
    adjusting engine operation based on degradation of the particulate filter in the engine exhaust conduit, the degradation determined based on a time interval between a first regeneration and a second regeneration of the metallic filter.

12. The method of claim 11, further comprising,
    during a first condition when particulate filter regeneration conditions are met and in response to the time interval being greater than a threshold time interval, regenerating the particulate filter in the engine exhaust conduit via one or more of a retarding spark and decreasing an air/fuel ratio when particulate filter regeneration conditions are met; and
    during a second condition and in response to the time interval being less than the threshold time interval, indicating to an operator degradation of the particulate filter and adjusting an engine actuator to reduce torque output.

13. The method of claim 11, wherein an inlet and outlet of the two parallel passages are coupled to the engine exhaust conduit downstream of the particulate filter and wherein the two parallel passages includes a first passage including a first venturi passage and a second passage including a second venturi passage.

14. The method of claim 13, wherein the first passage is disposed proximal to the engine exhaust conduit relative to the second passage and where the second passage is disposed distal to the engine exhaust conduit relative to the first passage.

15. The method of claim 14, wherein the second passage includes the metallic filter, the metallic filter positioned downstream of the second venturi passage.

16. The method of claim 13, further comprising regenerating the metallic filter in response to an exhaust flow ratio of a first flow rate through the first passage and a second flow rate through the second passage being greater than a threshold exhaust flow ratio.

17. The method of claim 16, wherein the metallic filter is disposed across an internal diameter of the second passage and further comprising determining the first flow rate based on a pressure drop across the first venturi passage and determining the second flow rate based on a pressure drop across the second venturi passage.

18. A system, comprising:
an exhaust conduit comprising a particulate filter;
a bifurcated passage positioned outside the exhaust conduit, with an inlet and outlet of the bifurcated passage coupled to the exhaust conduit downstream of the particulate filter, the bifurcated passage leading to parallel first and second tubes, where the second tube includes a second filter coupled to an electric circuit; and
a controller with computer readable instructions stored thereon for:
estimating an exhaust flow rate ratio of flow rates through the first tube and the second tube, regenerating the second filter when the exhaust flow rate ratio is greater than a threshold ratio, and adjusting engine operation based on a time difference between subsequent regenerations of the second filter being less than a threshold time difference;
wherein the first tube and second tube each comprise a venturi passage, and where the second filter is disposed downstream of a second venturi passage of the second tube.

19. The system of claim 18, wherein the filter is a metal filter and the electric circuit includes a switch and wherein regenerating the second filter includes closing the switch to increase a temperature of the second filter and burn soot from the second filter.

* * * * *